United States Patent [19]

Bennett et al.

[11] Patent Number: 5,067,323
[45] Date of Patent: Nov. 26, 1991

[54] THREE POSITION ACTUATOR ARRANGEMENT

[75] Inventors: Keith N. Bennett, West Palm Beach; Richard H. Pangretic, Jr., Palm Beach Gardens, both of Fla.

[73] Assignee: United Technologies Corporation, Hartford, Conn.

[21] Appl. No.: 537,965

[22] Filed: Jun. 13, 1990

[51] Int. Cl.⁵ .............................. F02C 1/00; F01B 7/02
[52] U.S. Cl. ......................................... 60/734; 91/525; 92/62; 92/13.6; 92/75; 92/86; 92/151; 60/39.27; 60/39.29
[58] Field of Search ................... 92/61, 62, 75, 50, 69, 92/86, 129, 151, 150, 152, 13.6; 60/39.27, 39.29, 734; 91/508, 520, 525, 530

[56] References Cited

U.S. PATENT DOCUMENTS

| | | |
|---|---|---|
| 1,571,044 | 1/1926 | Da Costa . |
| 2,649,842 | 8/1953 | Caldwell et al. ............ 92/152 |
| 3,511,048 | 5/1970 | Nemetz ...................... 92/151 |
| 3,646,753 | 3/1972 | Colman et al. .............. 60/39.27 |
| 3,861,822 | 1/1975 | Wanger ..................... 415/147 |
| 3,958,493 | 5/1976 | Fujita et al. ................ 92/62 |
| 3,999,375 | 12/1976 | Smith et al. ............... 60/39.27 |
| 4,002,105 | 1/1977 | Bell et al. .................. 92/151 |
| 4,398,558 | 8/1983 | Cadeddu ................... 92/86 |
| 4,815,285 | 3/1989 | Martin ...................... 60/39.29 |
| 4,915,012 | 4/1990 | Osthus et al. .............. 91/525 |

FOREIGN PATENT DOCUMENTS

| | | | |
|---|---|---|---|
| 2712449 | 9/1978 | Fed. Rep. of Germany | 92/151 |
| 2906916 | 9/1980 | Fed. Rep. of Germany | 92/62 |
| 1198151 | 12/1959 | France | 92/62 |
| 0579458 | 11/1977 | U.S.S.R. | 92/62 |

*Primary Examiner*—Edward K. Look
*Assistant Examiner*—Thomas Denion
*Attorney, Agent, or Firm*—Edward L. Kochey, Jr.

[57] ABSTRACT

Actuator (14) drives inlet vanes (22) selectively to three positions, using high (58) and low (56) pressure fuel as the driving medium. Each of the three position is externally adjustable (94, 92, 68). An overboard leak path (86) is provided at the most often sliding seal.

7 Claims, 3 Drawing Sheets

THREE POSITION ACTUATOR ARRANGEMENT

The Government has rights in this invention pursuant to a contract awarded by the Department of the Navy.

DESCRIPTION

1. Technical Field

The invention relates to three position actuators and in particular to an actuator suitable for use in an aircraft engine.

2. Background

Compressors of aircraft gas turbines conventionally have stationary inlet vanes that are aerodynamically designed to direct the airflow into the first stage of compressor blades. It is known to make these vanes variable in position to manage the angle at which the airflow is directed into the blades.

In a so called closed position the air is directed somewhat with a direction of rotation whereby the compressor gets less bite on the air. This is used during start and low power operation to avoid the initial stage pumping more air than later stages can handle without stalling the compressor.

When the vanes are in the open direction they direct the airflow into the direction of rotation, with this position being desired at the maximum thrust operating condition. Most of the time, however, the engine is operating at some intermediate condition and in particular a large portion of the operating time involves operation at cruise. It is worthwhile to set the vanes to some intermediate position during this cruise operation thereby achieving higher efficiency and more tolerance from stall.

A full range of control of the vanes is considered inappropriate because of the added weight as well a the increased complication of the apparatus and controls. Such complication also increases the risk of failure. Therefore, a three position actuator is preferred where it can be adjusted for the desired open condition, closed condition, and intermediate position. Each of these conditions should be adjustable for initial trimming of the engine, and maintenance retrimming of the engine. Further, if the mission of the engine is changed where a different cruise condition is required, it would be helpful to be able to relocate the intermediate position. All of these adjustments should be capable of being made outside of the actuator without a requirement for disassembly.

It is conventional in aircraft engines to use the fuel for the energizing actuator fluid. This is preferable since the fuel pump is already in place and both the high and low pressure fuel supply is available at the pump discharge or suction. Dealing with fuel in the area of a gas turbine engine leads to the possibility of a fire in the event of any leakage. Accordingly, any actuator using this fluid should be designed to avoid or minimize any leakage.

SUMMARY OF THE INVENTION

Within a cylindrical housing there is located both a small diameter piston and a large diameter piston. A drive shaft connected to the small piston slideably passes through the housing and is connected to the vanes to set them in the desired position.

These two pistons are abutable with lost motion spacing between them, thereby establishing three chambers. The pressure in each chamber may be varied by connecting it either to the fuel pump or the discharge of the fuel pump suction. With a high pressure in the intermediate chamber and a lower pressure adjacent the small piston, the small piston is driven to one extreme location.

With low pressure in the intermediate chambers, but high pressure in both outboard chambers, the lost motion space is closed. The difference in piston sizes establishes a force toward the small piston side. A stop acting on the large piston establishes the location of this intermediate position.

With high pressure outboard the small piston but low pressure in the other two chambers, the arrangement is driven to the other extreme, with the stop on the drive shaft limiting movement.

An adjustable rod threaded into the housing slideably passes through the large piston. This rod is adjusted to establish the intermediate position. A stop on the drive shaft operates against the outside of the housing to limit movement in one direction. A stop physically interacting with the drive shaft on the other end is also externally adjustable which limits movement in the alternate direction.

The seal between the stop rod and the housing is substantially a static seal in that there is no movement between the stop rod and the housing, except during adjustment of the apparatus. Accordingly, this seal can be depended upon to be reliable.

Where the drive shaft passes through the housing, there is sliding required during operation of the actuator. Accordingly, a double seal is provided with a vent space between the two seals. This vent space is located to a low pressure environment such as an overboard drain. Accordingly, any leakage through the first seal will be safely vented or drained while the second seal provides protection against the extremely small pressure within this intermediate zone.

DESCRIPTION OF THE PREFERRED EMBODIMENT

Figure 1:
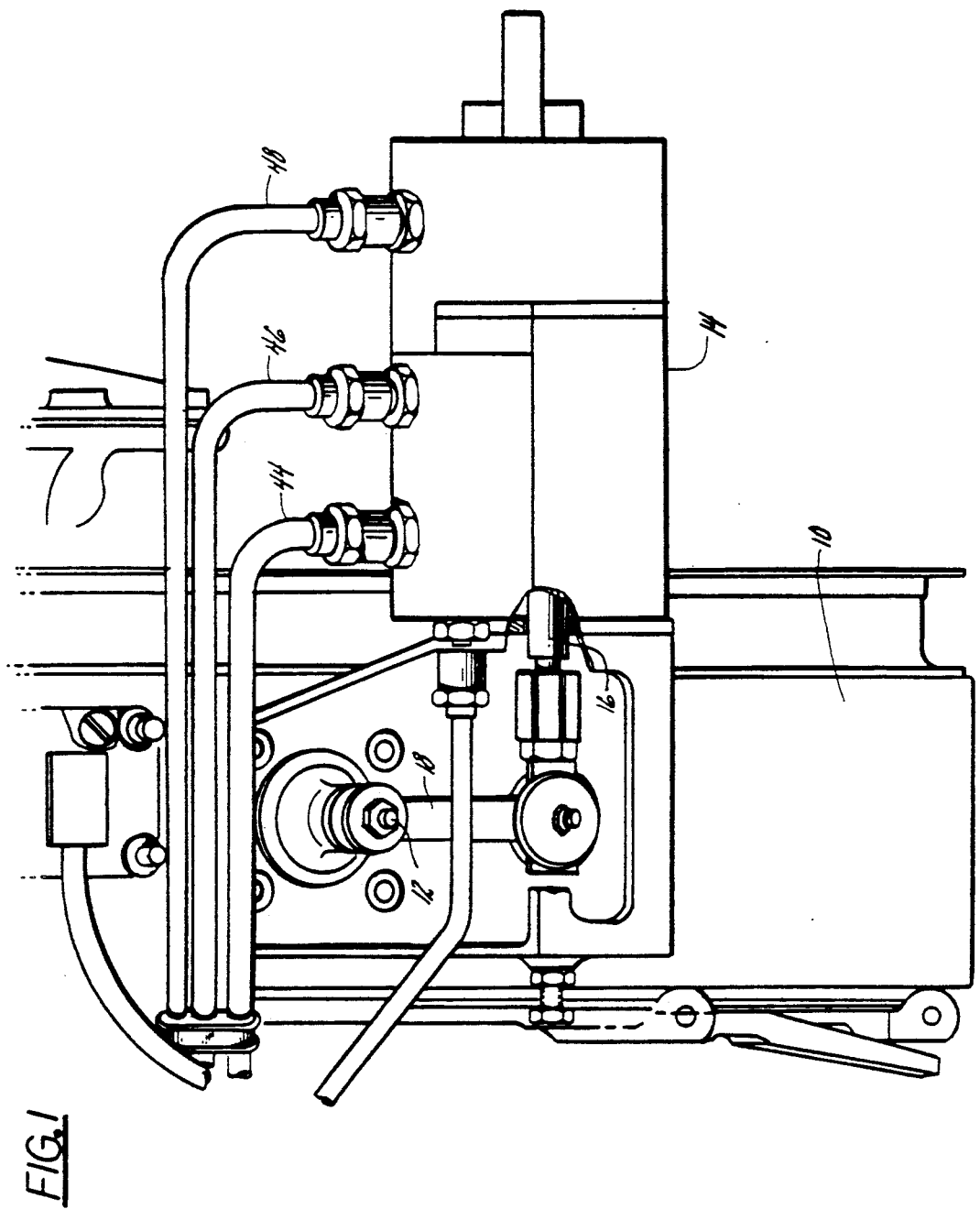
FIG. 1 is a view of the actuator attached to the engine case.

Referring to FIG. 1, casing 10 of a gas turbine engine has secured thereto a vane shaft 12 for the purpose of varying position of the vanes. Actuator 14 is bolted to the casing and includes a drive shaft 16 connected to arm 18 which will rotate shaft 12. The other linkage is not shown. Rotation of a single vane operates an ID synch ring to rotate a plurality. Preferably two actuators and their associated linkages are located around the circumference of the engine.

Figure 2:
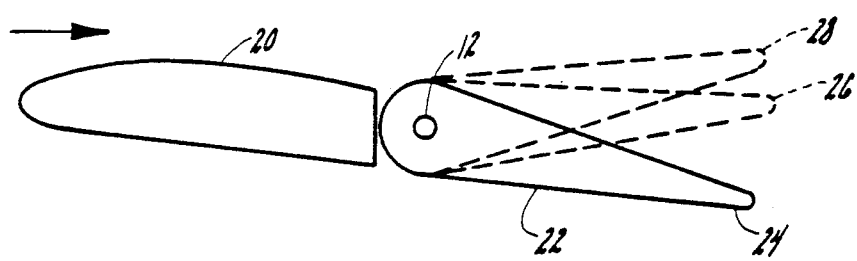
FIG. 2 is a view showing the various inlet vane positions.

In FIG. 2 the inlet case variable vane is shown with a fixed vane portion 20 and a variable vane portion 22 rotatable around shaft 12. This vane is selectively rotated from the closed position 24 to the intermediate or mid position 26 or to the open position 28.

Figure 3:
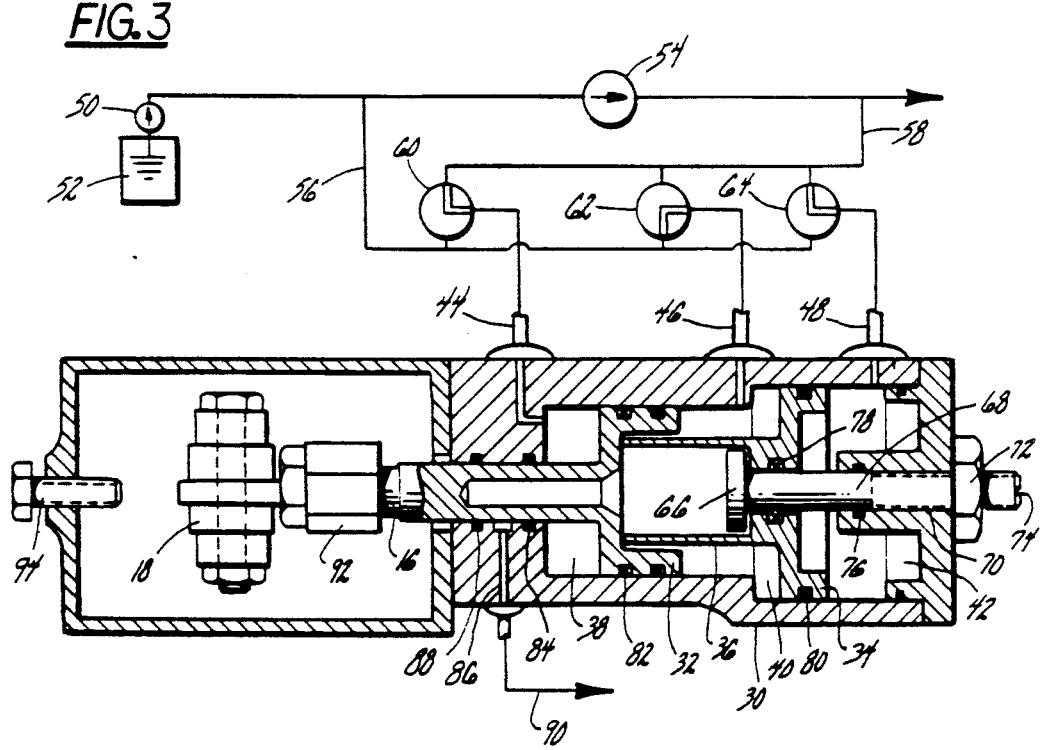
FIG. 3 is the actuator assembly in the intermediate position.

Referring to FIG. 3, cylindrical housing 30 has therewithin a first small diameter piston 32 and a second large diameter piston 34. Drive shaft 16 is connected to the small diameter piston and slideably passes through the housing. Extension 36 on the large diameter piston is abutable with a surface of the small diameter piston 32. It is noted that lost motion spacing exists between the pistons since each of the pistons may move away from this abutment condition as illustrated.

Figure 4:
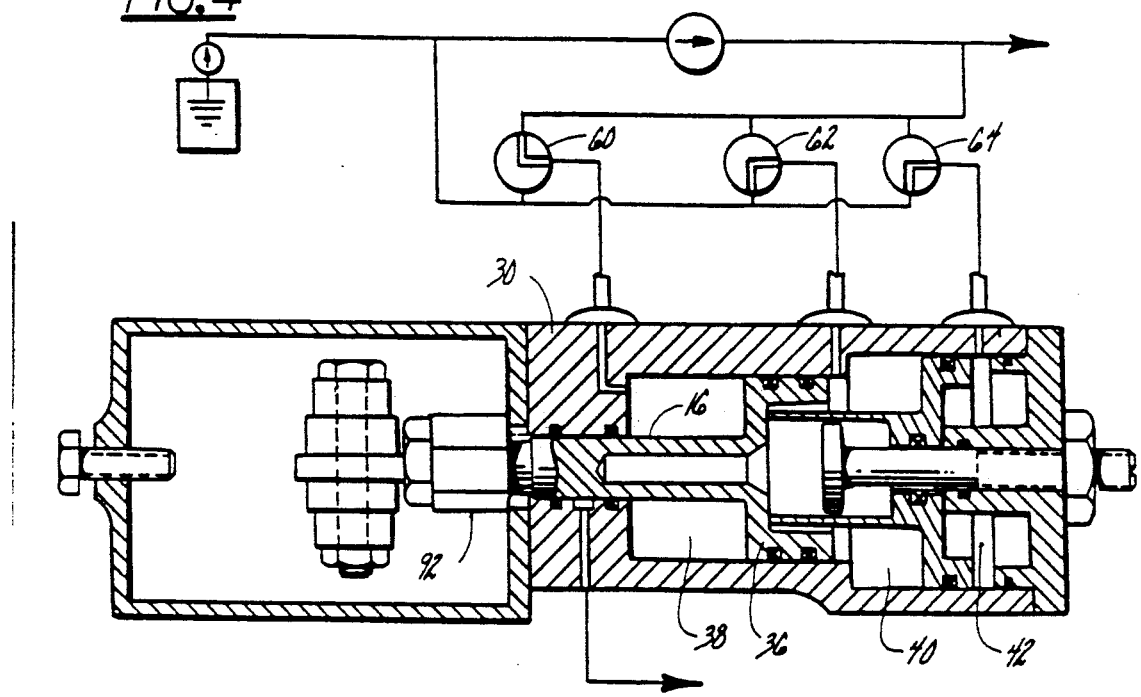
FIG. 4 is the actuator assembly in the closed position.

Referring to FIG. 4, these pistons together with the housing define a first chamber 38 between one end of the housing and the small diameter piston. They also define a second central chamber 40 between the two pistons as well as a third chamber 42 between the large diameter piston and the other end of the housing.

First conduit 44 is in fluid communication with chamber 38 and a second conduit 46 is in fluid communication with the central chamber 40. Also, a third conduit 48 is in fluid communication with chamber 42, as illustrated in FIG. 3.

Illustrated in FIG. 3 is a fuel supply wherein booster pump 50 draws fuel from the fuel tank 52 sending it to the main fuel pump 54. This fuel is then delivered to the combustor of the gas turbine engine. A low pressure sink line 56 is in communication with the pump suction and a high pressure source line 58 is in communication with the discharge of the main fuel pump. Selector valve 60 is operable to connect line 44 to either the high pressure line 58 as illustrated or to the low pressure line 56. Similarly, valve 62 will connect line 46 to either high or low pressure and valve 64 will do the same for line 48.

The intermediate position illustrated in FIG. 3 is achieved by directing the high pressure fluid into chamber 38 which drives the small piston 32 to the right. Low pressure fluid in chamber 40 permits a closure between the two pistons resulting in abutment of extension 36 against the small piston. High pressure in chamber 42 urges the large piston 34 to the left.

Since the effective area of large piston 34 is greater than that of the small piston 32, the result is to force both pistons to the left until the radial extensions 66 of stop rod 68 abut the larger piston 34. This establishes the midpoint position of the actuator.

Stop rod 68 is threaded within the housing with threads 70. By releasing jam nut 72 and using screwdriver slot 74 the stop rod may be adjusted to establish this intermediate position of the actuator. Jam nut 72 is thereafter tightened.

Seal 76 between the stop rod and the housing accepts relative movement only during the period of adjustment to locate the stop position. There is no motion during normal operation and accordingly reliable sealing is achieved. Seal 78 experiences sliding during normal operation of the actuator. However, this is only sealing between two chambers and leakage of the seal is not serious. Similarly, some leakage of seals 80 and 82 can be tolerated.

Where the drive shaft 16 passes through the housing there are two axially spaced circumferential seals. The first seal 84 seals against the full pressure within chamber 38 and a vent line 86 is provided outboard of this seal. A second seal 88 seals between this vent location and the surrounding atmosphere. The vent area is connected through line 90 to an overboard drain so that no pressure can be built up in this immediate space. Accordingly, despite the sliding on seals 84 and 88, a safe condition is achieved since all leakage passes overboard with seal 88 only being required to seal against an extremely small pressure.

FIG. 4 illustrates the actuator in the closed position with the drive shaft 16 is to the extreme right position. Here valve 60 is set to establish high pressure in chamber 38, forcing the small piston 36 to the right. Valve 62 is set to establish low pressure in chamber 40 and valve 64 is set to establish low pressure in chamber 42. There is no resisting force to the piston 36 so that it moves to the extreme right, with its movement being limited by the location of nut drive restraint nut 92 operating against housing 30. This nut is externally adjustable so that this extreme position may be set without disassembly of the actuator.

Figure 5:
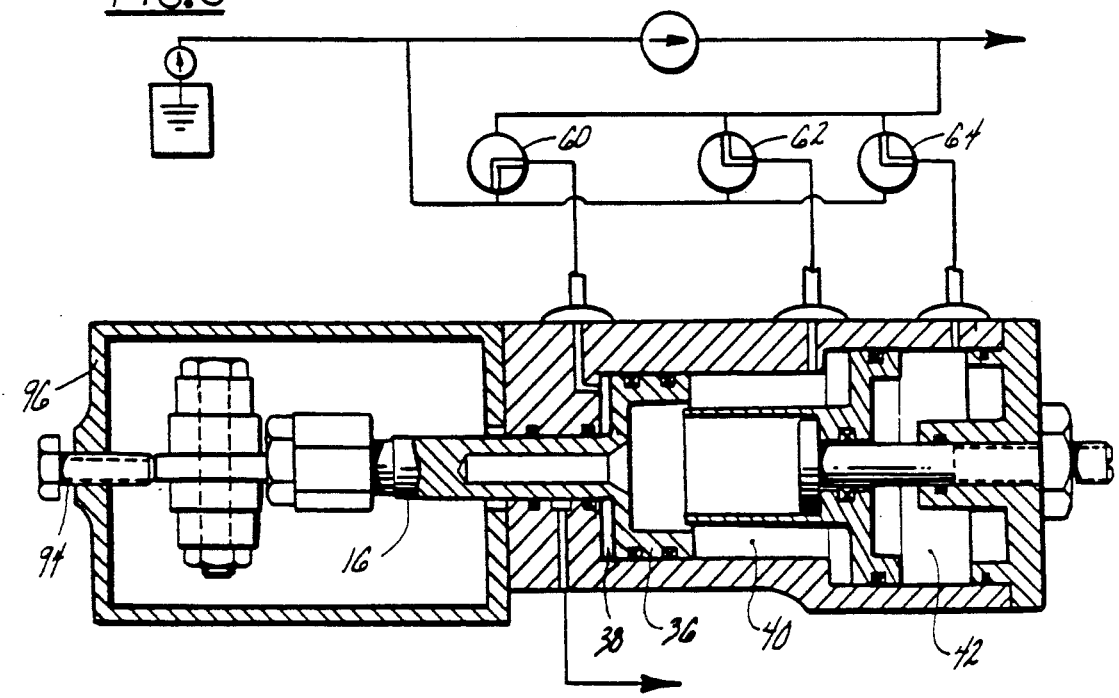
FIG. 5 is the actuator assembly in the open position.

FIG. 5 illustrates the other extreme condition where valve 60 is set to supply low pressure to chamber 38 and valve 62 is set to supply high pressure to chamber 40. This results in the piston 36 being driven to its extreme left position where the drive shaft 16 abuts against adjustable bolt 94 which is threaded into housing extension 96. Accordingly, this other extreme position may also be externally adjusted by bolt 94.

In this case valve 64 may be set for either high or low pressure in chamber 42 since it will have no effect on the position of small piston 36.

We claim:

1. A three position actuator arrangement for use in an aircraft gas turbine engine comprising:
    a cylindrical housing;
    a first small diameter piston having a drive shaft slideably passing through said housing;
    a second large diameter piston;
    said first and second pistons abutable with lost motion spacing therebetween;
    said pistons and housing defining axially spaced chambers comprising a first chamber between one end of said housing and said first piston, a second central chamber between said first and second pistons, and a third chamber between said second piston and the other end of said housing;
    a first conduit in fluid communication with said first chamber;
    a second conduit in fluid communication with said second chamber;
    a third conduit in fluid communication with said third chamber;
    a high pressure fluid source;
    a low pressure fluid sink;
    selection means for selectively connecting each of said chambers with said source and sink; and
    an adjustable stop rod adjustably secured to said housing adjacent said third chamber, slideably and sealingly passing through said second large diameter piston, and having a radial extension within said second chamber abutable with said second larger piston.

2. A three position actuator arrangement as in claim 1 further comprising:
    said drive shaft having two axially spaced circumferentially seals between said drive shaft and said housing; and
    a vent conduit in fluid communication with the space between two axially spaced circumferential seals.

3. A three position actuator arrangement as in claim 1 further comprising:
    a fuel pump;
    said high pressure fluid source being said fuel pump discharge;
    said low pressure sink being in communication with said fuel pump suction.

4. A three position actuator arrangement as in claim 1 further comprising:

said adjustable rod threadedly secured to said housing.

5. A three position actuator arrangement as in claim 2 further comprising:
a fuel pump;
said high pressure fluid source being said fuel pump discharge; and
said low pressure sink being in communication with said fuel pump suction.

6. A three position actuator arrangement as in claim 2 further comprising:
said adjustable rod threadedly secured to said housing.

7. A three position actuator arrangement as in claim 5 further comprising:
said adjustable rod threadedly secured to said housing.

* * * * *